United States Patent
Rai et al.

(10) Patent No.: US 12,523,982 B2
(45) Date of Patent: Jan. 13, 2026

(54) METHOD FOR AUTOMATED 3D PRINT QUALITY ASSESSMENT AND REDESIGN

(71) Applicant: The Research Foundation for The State University of New York, Buffalo, NY (US)

(72) Inventors: Rahul Rai, East Amherst, NY (US); Prakhar Jaiswal, Buffalo, NY (US)

(*) Notice: Subject to any disclaimer, the term of this patent is extended or adjusted under 35 U.S.C. 154(b) by 902 days.

(21) Appl. No.: 17/267,430

(22) PCT Filed: Aug. 9, 2019

(86) PCT No.: PCT/US2019/046068
§ 371 (c)(1),
(2) Date: Feb. 9, 2021

(87) PCT Pub. No.: WO2020/033932
PCT Pub. Date: Feb. 13, 2020

(65) Prior Publication Data
US 2021/0325848 A1    Oct. 21, 2021

Related U.S. Application Data

(60) Provisional application No. 62/716,454, filed on Aug. 9, 2018.

(51) Int. Cl.
G05B 19/4099 (2006.01)
B22F 10/85 (2021.01)
(Continued)

(52) U.S. Cl.
CPC .......... *G05B 19/4099* (2013.01); *B22F 10/85* (2021.01); *B33Y 50/02* (2014.12); *G06T 7/50* (2017.01); *G05B 2219/35134* (2013.01)

(58) Field of Classification Search
CPC ...... G05B 19/4099; G05B 2219/35134; B22F 10/85; B33Y 50/02; B33Y 50/00;
(Continued)

(56) References Cited

U.S. PATENT DOCUMENTS

| | | | |
|---|---|---|---|
| 10,061,870 | B2 | 8/2018 | Nelaturi et al. |
| 10,248,740 | B2 | 4/2019 | Griffith et al. |

(Continued)

FOREIGN PATENT DOCUMENTS

| | | |
|---|---|---|
| WO | 2014/074954 A2 | 5/2014 |
| WO | 2017/194072 A1 | 11/2017 |
| WO | 2018/191035 A1 | 10/2018 |

OTHER PUBLICATIONS

Tedia, S., et al., Manufacturability Analysis Tool for Additive Manufacturing Using Voxel-Based Geometric Modeling, Proceedings of the 27th Annual International Solid Freeform Fabrication Symposium—An Additive Manufacturing Conference, Aug. 2016, pp. 3-22.

(Continued)

*Primary Examiner* — Ziaul Karim
(74) *Attorney, Agent, or Firm* — Hodgson Russ LLP

(57) ABSTRACT

Shape diameter-based approaches to identifying and correcting 2D slices of 3D models (or the 3D models themselves) are provided for improved manufacturability. Using the present approaches, critical error-prone regions in 2D slices or 3D models can be identified, including thin extrusions and bridges, sharp corners, small holes, and narrow intrusions. The areas of these regions can be computed and used to quantify the printability of the slices or models. The boundaries of slices or models can be modeled as mass-spring-damper systems for performing local deformations to correct error-prone regions. External forces, that are a function of shape diameters and interior angles, can be imposed on the modeled systems for this purpose.

5 Claims, 12 Drawing Sheets

(51) Int. Cl.
*B33Y 50/02* (2015.01)
*G06T 7/50* (2017.01)

(58) Field of Classification Search
CPC ........ G06T 7/50; G06F 2119/18; G06F 30/17; G06F 30/20; G06F 2113/10; Y02P 90/02; Y02P 10/25; B29C 64/386
See application file for complete search history.

(56) References Cited

U.S. PATENT DOCUMENTS

| | | | |
|---|---|---|---|
| 2011/0182477 A1* | 7/2011 | Tamrakar | G06T 617/44 382/110 |
| 2013/0297059 A1 | 11/2013 | Grifith et al. | |
| 2015/0269282 A1 | 9/2015 | Nelaturi et al. | |
| 2015/0276468 A1* | 10/2015 | Jaeger | G01G 19/08 382/154 |
| 2015/0278414 A1 | 10/2015 | Zhou et al. | |
| 2016/0096318 A1* | 4/2016 | Bickel | B33Y 30/00 425/150 |
| 2016/0320771 A1 | 11/2016 | Huang | |
| 2017/0124726 A1 | 5/2017 | Soulard et al. | |
| 2017/0203515 A1* | 7/2017 | Bennett | B29C 64/393 |
| 2018/0056594 A1 | 3/2018 | Sterenthal et al. | |
| 2018/0056640 A1* | 3/2018 | Yoshida | G06T 17/10 |
| 2018/0133970 A1* | 5/2018 | Boyer | B33Y 10/00 |
| 2018/0178446 A1 | 6/2018 | Nosenzo et al. | |
| 2018/0349530 A1 | 12/2018 | Antoine et al. | |
| 2018/0361729 A1 | 12/2018 | Gibson et al. | |

OTHER PUBLICATIONS

Chen, S., et al., Fast and robust shape diameter function, PLoS ONE, Jan. 26, 2018, vol. 13, No. 1, e0190666, pp. 1-18.

Stava, O., et al., Stress relief: improving structural strength of 3D printable objects, ACM Transactions on Graphics (TOG), Jul. 2012, vol. 31, No. 4, article 48, 11 pages.

Fickenscher, E., Using Voxelization and Ray-Tracing to Identify Wall Thinness of Polygonal Models, University of Washington, Tacoma, Institute of Technology Graduate Student Research, Dec. 2008, pp. 1-46.

* cited by examiner (a)

(b)

METHOD FOR AUTOMATED 3D PRINT QUALITY ASSESSMENT AND REDESIGN

CROSS-REFERENCE TO RELATED APPLICATIONS

This application claims priority to U.S. Provisional Application No. 62/716,454, filed on Aug. 9, 2018, the disclosure of which is incorporated herein by reference.

FIELD OF THE DISCLOSURE

The present disclosure relates to 3-dimensional (3D) printing, and more particularly to pre-processing for 3D printing.

BACKGROUND OF THE DISCLOSURE

The recent advancement of additive manufacturing technology has allowed for fabrication of highly complex parts that were difficult to produce using traditional manufacturing techniques. However, designers and novice users of additive technologies often lack the awareness of manufacturing considerations leading to lower quality parts and failures. Therefore, it is crucial to develop an automated system that can analyze and correct designs before they are sent for fabrication so that wasteful iterations of build-test-redesign can be minimized.

Additive manufacturing technology has expanded the scope of complexity in 3D models that can be realized in an industrial or a prototype part. It allows designers and engineers to broaden the limits of the design space and think beyond what was possible a decade ago. Highly complex 3D designs, which were impossible or expensive to produce using conventional manufacturing techniques, are now being manufactured with the help of advanced additive manufacturing technology. Although the feasible design space is widening, there are still certain limitations of all existing additive manufacturing processes. The limitations vary based on the physical constraints, material constraints, or the constraints posed by the process itself. Often the limitations arise in the form of minimum feature size producible by the process. For instance, a 3D printer based on fused deposition modeling technology cannot produce features that has local diametrical size smaller than the printer's nozzle diameter.

The lack of manufacturing information and details during the design phase is commonplace. Therefore, the designers, engineers, and novice users of 3D printing technology often design parts that end up being either impossible, difficult, or very expensive to manufacture. This leads to unnecessary design iterations due to discord between design and manufacturing specifications. In addition, it is sometimes not possible for manufacturing specialist to discern the manufacturability of a design using a given additive process. Only after testing the process by producing the design and evaluating the printed model, a decision can be made. This accounts for needless loss of time, money, and resources in terms of man-hours, machine-hours, and material wastage. Furthermore, it is sometimes challenging to identify errors in the printed model due to limitations of testing strategies and physical limitations in probing complex and inaccessible regions of 3D models.

BRIEF SUMMARY OF THE DISCLOSURE

In this disclosure, a variation of shape diameter function and morphological operations are used to identify critical regions in two-dimensional (2D) slices of 3D models that can potentially cause errors in printing. Printability of slices has been quantified using an area-based printability index. In addition, a physics-based mesh deformation scheme is adopted to make localized corrections to slices for improving printability. The approach has also been extended to three-dimensions for correcting critically thin regions of 3D models.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

1. Introduction

Figure 1:
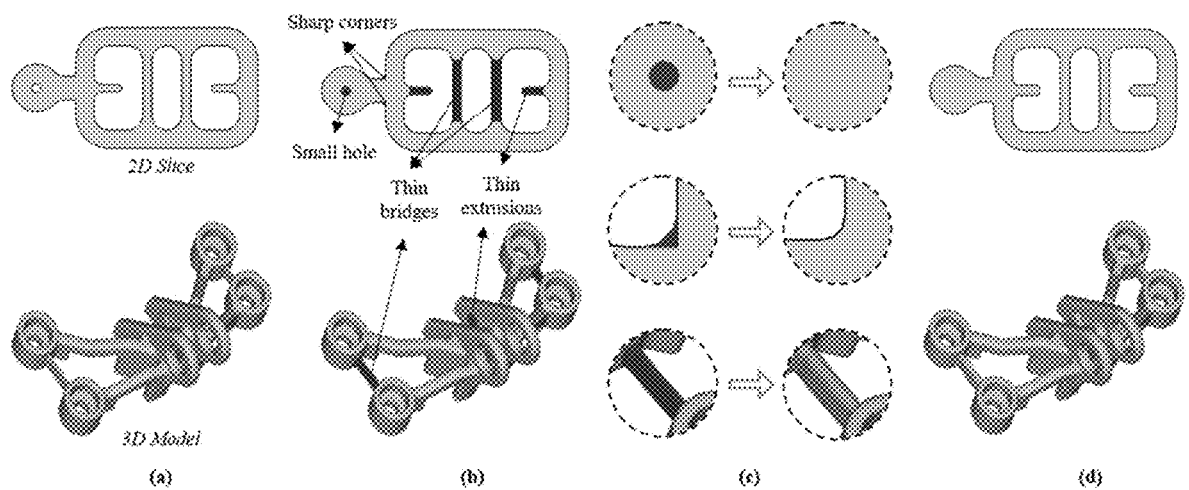
FIG. 1: (a) Raw input: 2D slices or 3D models, (b) Error-prone region identification, (c) Localized corrections, and (d) Final rectified output.

To overcome the need for arduous and wasteful manual post-design procedures, it can be important to automatically identify and fix critical error-prone regions of 3D models before fabrication (FIG. 1). Certain types of error-prone regions include thin features (extrusions, intrusions, and bridges), sharp corners and edges, small holes, and the like. The process used for printing and the printer specific parameters are factors (characteristics) that govern which regions would cause errors in printing. An error in printing signifies that the difference in the desired model and the printed part cannot be considered insignificant in terms of its shape, size, or functionality. In existing literature, a few methods have been proposed that attempt to identify error-prone regions in a 3D model or their 2D slices. All such methods use one key parameter called printer resolution.

Printer resolution is the smallest instantaneous chunk of material that can be deposited at any moment by the printer. The printer resolution characterizes which regions are too small, sharp, or thin for the printer to create correctly. Hence, to identify such error-prone regions, printer resolution must be known. In addition, printer resolution can be used to make corrective changes in the 3D model to sufficiently fix those regions and avoid errors in printing. In this disclosure, a modified shape diameter function for 2D slices is demonstrated along with a few morphological operations to identify critical error-prone regions in 2D slices. Additionally, a method—called SDFix—is disclosed for locally correcting error-prone regions by boundary deformation. The SDFix method models the boundary of a slice as a system of masses, springs, and dampers. Furthermore, the disclosed approach is demonstrated to be extendable to three dimensions. The thin features of 3D models that cause complications in manufacturing processes, such as casting and milling, or are a reason for structural failures, can be rectified using 3D-SDFix.

It can also be advantageous to define a printability index of a slice or a 3D model (comprising multiple slices) that quantifies the printability in a particular build orientation. An area-based printability index computation is also disclosed herein. The quantification of printability can prove to be useful in making valuable decisions regarding, for example, printability vs. cost trade-off. It can also be utilized in comparing multiple design solutions and finding optimal build orientations.

2. Related Work

Design for manufacturing (DFM) aims to reduce the lead time by bridging the gap between designing and manufacturing. Some organizations employ inter-departmental teams to provide feedback from manufacturing engineers to designers during the design phase for improving manufacturability. Manufacturing guidelines for various manufacturing processes have also been documented to increase the design engineer's understanding of manufacturing considerations. The guidelines were intended to be studied carefully by designers to avoid configurations resulting in poor manufacturability. But with the increasing availability of low-cost computational power, the task of manufacturability analysis is partly diverted to advanced computer-aided design and manufacturing tools.

The advancement of various additive manufacturing techniques and its increasing popularity has driven the research into design for additive manufacturing (DFAM). Due to distinct characteristics of different additive manufacturing techniques, often the research in DFAM is focused on a particular technique or a few specific techniques. Some researchers formalized DFAM for additive manufacturing with cellular structures. Others presented an approach for manufacturability evaluation for hybrid manufacturing involving both subtractive and additive processes. Others performed multiple experiments with a set of design features to develop guidelines for selective laser sintering (SLS) technology. Metallic additive manufacturing was investigated by other researchers and a four-step designing methodology was formulated to exploit its capabilities. A design rule catalog was developed by researchers for laser sintering, laser melting, and fused deposition modeling (FDM). Klahn et al. used design rules and criteria to select and redesign components for additive manufacturing. Ponche et al. presented a numerical chain-based DFAM methodology for metallic additive manufacturing. Ranjan et al. proposed a novel design methodology for assisting designers in building additive manufacturing friendly designs. Their feature graph-based approach is helpful in improving pre-existing designs for better manufacturability, whereas their topology optimization-based method helps in creating entirely new lightweight designs for additive manufacturing.

In the present disclosure, error-prone regions of preexisting designs are identified and local modifications are made to improve manufacturability. Telea and Jalba used morphological operations to segment and categorize regions of 3D models. They also proposed an area-based and geodesic-distance based printability metric. However, their approach disregards build orientations and is sensitive to voxel resolution. Rao et al. developed a spectral graph theory based approach to quantify the spatial error in dimensional integrity of additively manufactured components. However, methods for redesigning 3D models were not discussed in these works. Nelaturi et al. developed a mathematical morphology-based approach to create printability map and perform model correction on 2D slices of 3D models. But the medial-axis based approach used by them is very sensitive to discretization and often disrupts the smoothness of slice boundaries. The present disclosure incorporates a shape diameter-based approach and optionally along with morphological operations to identify and fix critical regions of 2D slices and 3D models while preserving the smoothness of their boundaries.

Shape diameter function (SDF) is a method for estimating local thickness of shapes. It has been used for shape segmentation, finding symmetries, shape retrieval, and skeleton extraction. In some embodiments of the present disclosure, a 2D variation of SDF is implemented for segmenting thin regions in the slices of 3D models. Furthermore, external forces are defined based on SDF values to locally deform the slices for better printability. The deformation of the slice boundary (and surface mesh) is achieved by a physics-based approach using mass, spring, and damper system. Mesh deformation has been used in the computer graphics community to create visually appealing and realistic animations. The physics-based approach used in the present disclosure allows for large time steps (faster convergence) while maintaining stability using linear implicit scheme. Fast solvers with parallel computations are employed to obtain real-time performance. The present approach has also been extended to three-dimensions for thickening the thin regions of 3D models by locally deforming its triangulated surface mesh.

3. Critical Region Identification in the Slices of 3D Models

Figure 2:
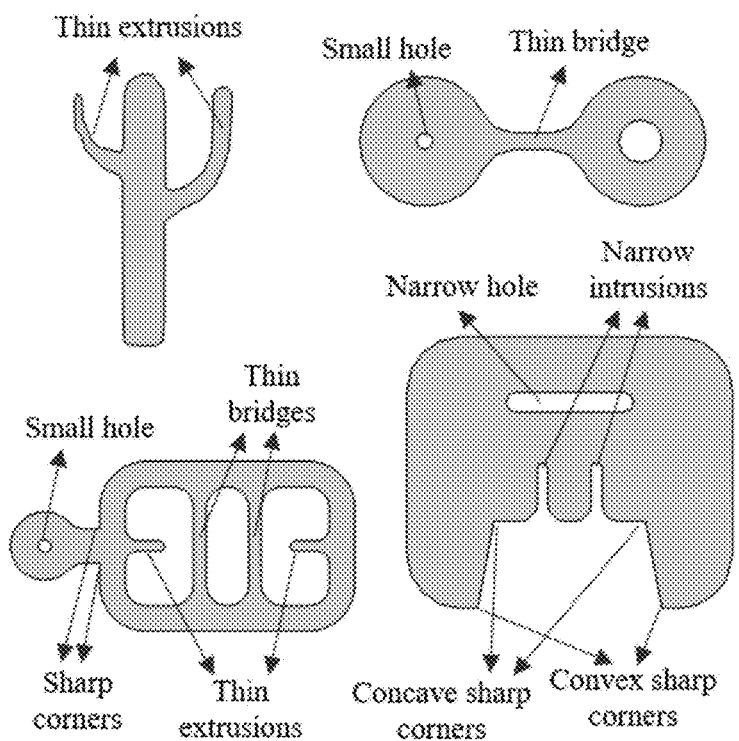
FIG. 2: Error-prone regions in additive manufacturing of 2D slices.

Additive manufacturing is a layer-wise process, i.e., it builds the complete 3D model by successively printing one layer at a time. Therefore, to achieve the desired 3D model, each layer should be printed without significant error. Moreover, each layer can be analyzed independently to ensure that the printer doesn't fail to correctly print any region of the layer. A layer of 3D model is called a "slice," which is obtained by intersecting the 3D model by a 2D plane normal to the build direction at an appropriate height. Examples of 2D slices with error-prone regions are shown in FIG. 2.

In this section, we disclose an approach to identify the critical error-prone regions in slices of 3D models that are relevant for additive manufacturing. Because the computation and analysis happen in two-dimensions, printer resolution is considered to be defined as the diameter (T) of a circle, which represents the smallest area that can be printed by the printer. The diameter may be approximated to be equal to the nozzle diameter for FDM or the laser beam width for SLS.

3.1. Thin Features

Certain constraints, such as manufacturability and structural performance, require a design (a 3D model) to have a specific minimum feature size. In the case of additive manufacturing, the printer specific parameters (characteristics such as nozzle diameter or laser beam width) usually guide a minimum feature size producible. Features having a local diameter smaller than the printer resolution, such as the thin bridges and extrusions shown in FIG. 2, will introduce errors in the print. In this disclosure, a 2D variation of a shape diameter function (SDF) is used for identifying thin features in a slice.

3.1.1. Shape Diameter Function (SDF)

A slice can be composed of multiple polygons (convex and/or concave), polygons with holes, and nested polygons and holes. Each polygon (or hole) in a slice is defined by an ordered list of its boundary vertices, which are connected by straight edges. The ordering of vertices is traditionally standardized as counter-clockwise (CCW) for polygons and clockwise (CW) for holes. Let $\mathbb{S}$ represent the manifold boundary of the slice S. The shape diameter function $\mathcal{S}°$: $\mathbb{S} \to \mathbb{R}$ is a scalar-valued function that maps each point $p \in \mathbb{S}$ to a real value in $\mathbb{R}$ representing the local diameter. In a discrete setting, the SDF associates each vertex v on a boundary of a slice with an estimation of its local diameter $\mathcal{S}°(v)$.

The present disclosure may be embodied as a method 100 for automatically determining thin features of a slice of a 3D model using SDF. The method 100 includes obtaining 103 a slice of a 3D model to be printed on a printer, where the printer has a printer resolution ($\tau$). The obtained slice may be obtained in any manner. For example, the method 100 may include the step of slicing the 3D model, which may be done according to the printer to be used. In another example, the slice is obtained from a separate process. The slice has boundary edges that define the shape of the slice. For example, a slice of a 3D model may have a boundary (or more than one boundary) which is made up of a plurality of boundary edges and vertices, where adjacent boundary edges meet at a vertex (see, for example, FIG. 3A). Although embodiments are described generally herein with reference to a boundary of a 2D slice, the techniques of the disclosure apply to slice shapes having more than one boundary and such shapes are within the present scope. The method 100 may include obtaining 106 a set of rules that defines one or more characteristics of the printer, including a printer resolution T.

Figure 3:
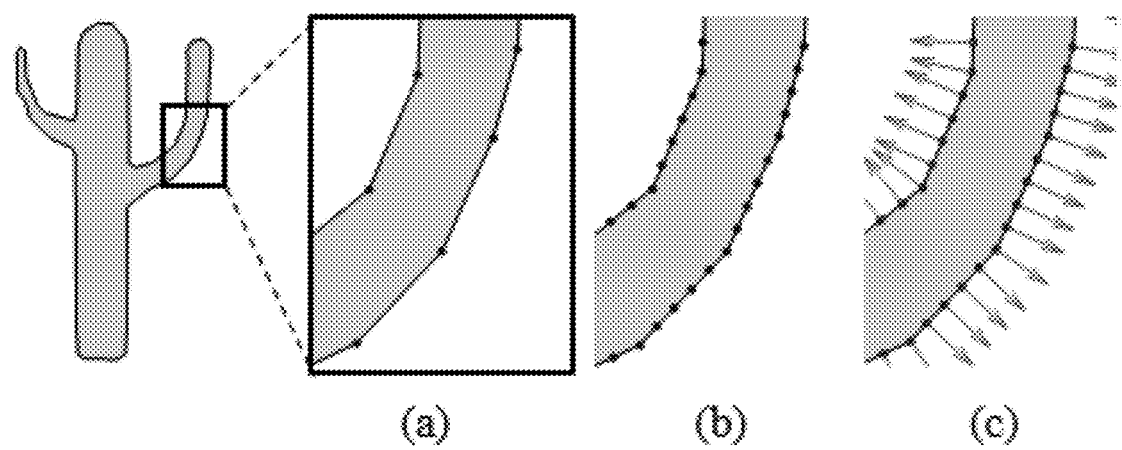
FIG. 3: (a) Zoomed in region of a slice with vertices (before resampling) marked as black dots. Consecutive vertices are connected by edges. (b) Resampled slice boundary. (c) Outward vertex normals computed on slice boundary.

To compute shape diameter at a high resolution on the boundary of the slice, the boundary edges (e.g., polygon edges) defining the boundary may be resampled 130. Resampling 130 can be performed to, for example, shorten long edges and introduce new vertices on the boundary while keeping the shape of the slice unaffected (see, for example, FIG. 3B). In an exemplary embodiment of resampling, a threshold edge-length (g) was defined. In the present, non-limiting example, the threshold edge-length (g) was equal to one-fourth of the printer resolution ($\tau/4$). It should be noted that other threshold edge-lengths may be utilized. In the exemplary resampling embodiment, each edge on the slice boundary may be split into equal parts. In this way, an $i^{th}$ edge with edge-length ($l_i$) is resampled into $n_i$ equi-length edges, such that the new edge-lengths are less than or equal to g (FIG. 3b). Hence, new vertices are added on the slice boundary (or boundaries). The number of new edges $n_i$ on the $i^{th}$ edge can be computed as:

$$n_i = \left\lceil \frac{l_i}{g} \right\rceil \tag{1}$$

Figure 4:
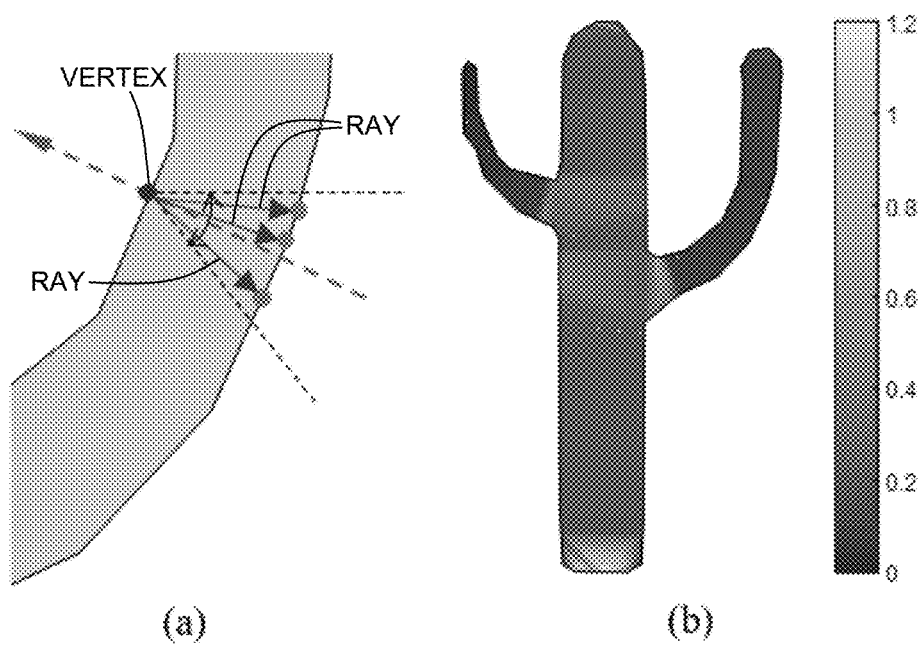
FIG. 4: (a) SDF computation: Multiple rays are shot from a vertex at the boundary within an angular range from its inward normal. The distances traveled by the rays before intersecting the boundary is used to compute SDF. (b) SDF computation result shown as an interpolated shaded plot on the slice.

A vertex normal is calculated 109 for each vertex on the boundary. A vertex normal is an outward pointing unit vector that bisects the exterior angle between the two boundary edges incident on a vertex. FIG. 3c depicts the vertex normals as outwardly-pointing vectors (arrows) at each vertex. The inward vertex normal can be calculated 112 for each vertex by negating the (outward) vertex normal. To compute the SDF $\mathcal{S}°(v)$ at a vertex v, a number rays are sent (traced 115) from the vertex v, each in a direction different from the other rays but within a small angular range around the inward normal. The distances $d_i$ the rays travel before their first intersection with the boundary of the slice are calculated 118 (FIG. 4a). The median ($\mu$) of all the distances ($d_i$) may be calculated 121 as the SDF value for the corresponding vertex. To avoid outliers, the standard deviation ($\sigma$) may also be calculated 124 and distances outside one-standard deviation around the median may be ignored, such that the average of the remaining distances is used as the SDF value for the corresponding vertex.

$$\mathcal{S}°(v) = \operatorname{avg}(\{d_i; \mu - \sigma \leq d_i \leq \mu + \sigma\}) \tag{2}$$

Figure 5:
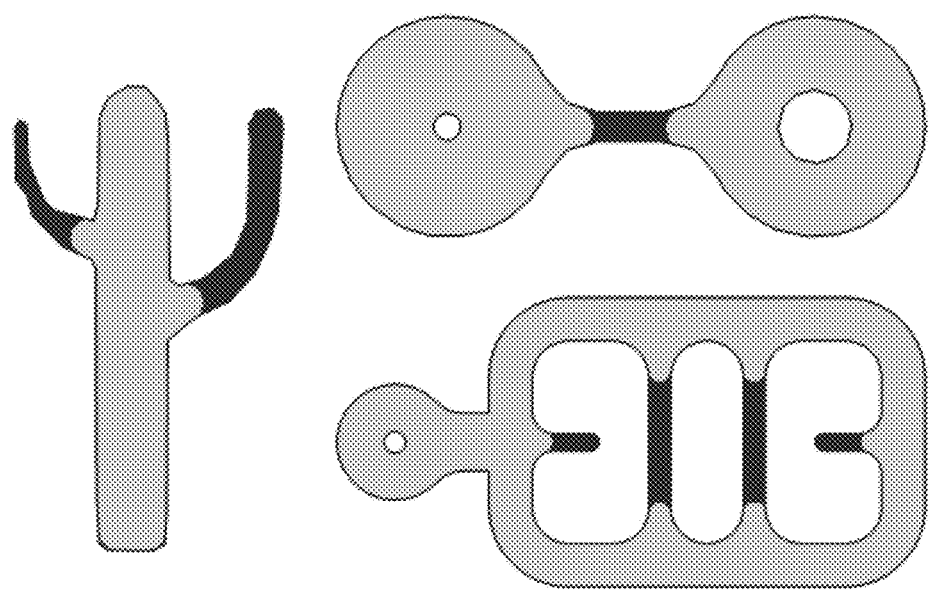
FIG. 5: Thin regions (dark shaded) of slices identified by thresholding SDF values.

The number of rays to be sent 115 from each vertex may be pre-determined. In an exemplary study, the number of rays sent from each vertex was 12. However, the number of rays may be more or less, such as, for example, a number of rays selected in the range of 1 to 20, inclusive, or more. In the exemplary study, the angular position of rays was sampled using uniform random distribution in the range [−15°, 15°] around the inward normal, though other distributions and angular ranges (greater angular range or lower angular range) may be used. The intersection computation may be performed using, for example, an AABB (axis aligned bounding boxes) tree scheme implemented in CGAL C++ library. The interpolated shaded plot of the SDF values computed on boundary vertices of an example slice are shown in FIG. 4b. Each vertex having an SDF value below a first threshold may be regarded as associated with thin features. The first threshold may be, for example, the printer resolution ($\tau$). Thin regions identified in example slices from the study are depicted in FIG. 5. In this way, thin features may be identified 127 based on vertices with an SDF value below the first threshold. An output may be generated 133 based on the identified 127 thin features. For example, the output may be a display having a shaded or colored region, or otherwise depicting the thin feature differently than the remainder of the model (for example, differently depicted in the sense of one or more characteristic such as, for example, color, brightness, etc.)

3.2. Sharp Corners

Another error-causing region in the printing of slices is a sharp corner. Due to the finite size of the printer resolution, achieving sharp corners in a slice by the printer is difficult. Ideally, all the edges and corners of a design would be appropriately rounded during the design phase for adequate manufacture of the product. In cases where sharp corners are present in a slice, they will usually be printed as rounded corners generally equivalent to the printer resolution. However, such rounded corners might not be desirable features in an end product. Therefore, identification of sharp corners before manufacture may be advantageous.

Figure 6:
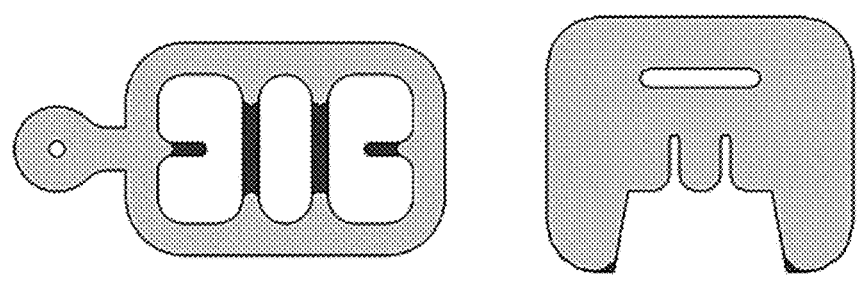
FIG. 6: (a) Thin regions and convex sharp corners identified using morphological opening operation. Note that it failed to identify concave sharp corners. (b) Convex and concave sharp corners identified using interior angle computation at vertices on the slice boundary.
Figure 6:
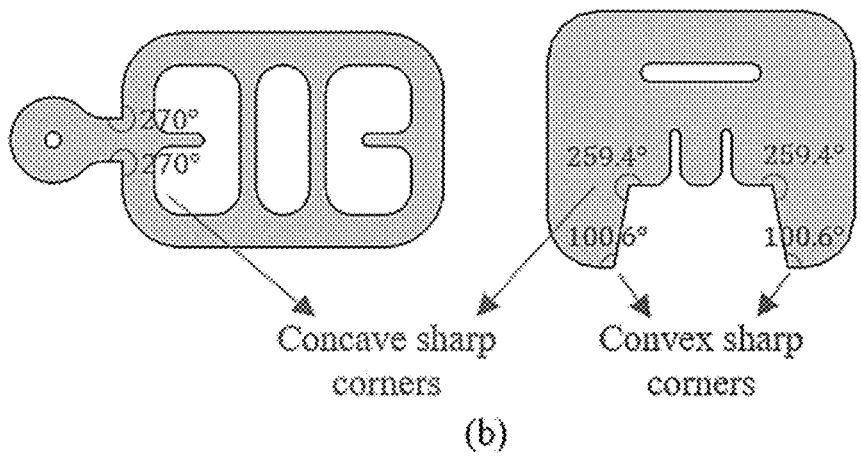

Mathematical morphology can be used to diagnose convex sharp corners on a slice. Given a slice S and the printer resolution T, let P represent the printable region of the slice and $\tilde{P}$ represent the unprintable regions. $\tilde{P}$ will include regions that are smaller than the printer resolution. The following expressions involving dilation ($\delta$) and erosion ($\in$) operations will result in printable and unprintable regions of the slice S, respectively.

$$P = \Psi(S,\tau) = \delta_\tau(\epsilon_\tau(S)) \quad (3)$$

$$\tilde{P} = S - P \quad (4)$$

where, $\Psi(A, b)$ represents the morphological opening operation performed on A with a circular structuring element of diameter b. The opening operation involves erosion with the structuring element followed by dilation with the same structuring element. The unprintable region $\tilde{P}$ may include both thin regions and convex sharp corners (see, for example, FIG. 6a). The inability to identify concave sharp corners leaves this method wanting.

Another approach to recognize sharp corners (both convex and concave) in a slice is to compute the interior (inward) angles ($\beta$) at the vertices of the polygons defining the slice. The vertices, where the interior angle is below a certain lower threshold ($\beta_l$), is considered a convex sharp corner, and where it is above the upper threshold ($\beta_u$) is considered a concave sharp corner (see FIG. 6b). Therefore, all the vertices v with $\beta(v)$ in the range [$\beta_l$, $\beta_u$] are considered flat or soft corners and the remaining are sharp corners. In an illustrative example, values of 150° and 210° are used for $\beta_l$ and $\beta_u$, respectively. These values were established by approximating the printer resolution circle of diameter $\tau$ as a twelve-sided regular polygon. Other values, larger or smaller, may be used and will be apparent in view of the present disclosure.

Figure 16:
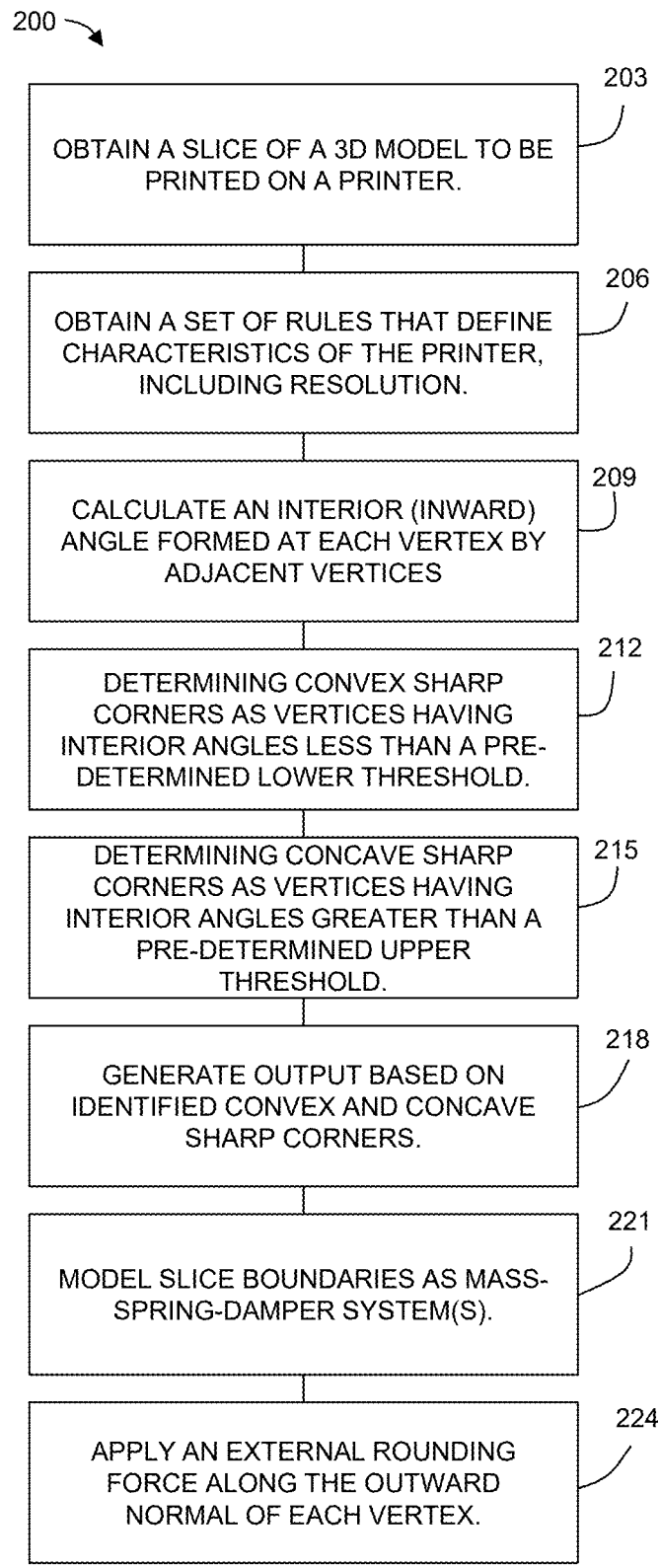
FIG. 16 is a flowchart showing a method according to another embodiment of the present disclosure.

With reference to FIG. 16, in another embodiment of the present disclosure, a method 200 is provided for determining sharp corners of a 3D model (a slice of a 3D model). The method 200 includes obtaining 203 a slice of a 3D model to be printed on a printer, where the printer has a printer resolution ($\tau$). The obtained slice may be obtained in any manner. For example, the method 200 may include the step of slicing the 3D model, which may be done according to the printer to be used. In another example, the slice is obtained from a separate process. The slice has boundary edges that define the shape of the slice. For example, a slice of a 3D model may have a boundary (or more than one boundary) which is made up of a plurality of boundary edges and vertices, where adjacent boundary edges meet at a vertex (see, for example, FIG. 3A). The method 200 may include obtaining 206 a set of rules that defines one or more characteristics of the printer, including a printer resolution T.

The interior (inward) angles ($\beta$) of each vertex (e.g., formed with the adjacent vertices) of the slice boundary is calculated 209. A convex sharp corner is determined 212 as each vertex where the interior angle is below a lower threshold ($\beta_l$). A concave sharp corner is determined 215 as each vertex where the interior angle is above an upper threshold ($\beta_u$). An output may be generated 218 based on the identified 212, 215 convex and concave sharp corners features. For example, the output may be a display having a shaded or colored region, or otherwise depicting the sharp corners differently than the remainder of the model (for example, differently depicted in the sense of one or more characteristic such as, for example, color, brightness, etc.)

3.3. Small Holes and Narrow Intrusions

Figure 7:
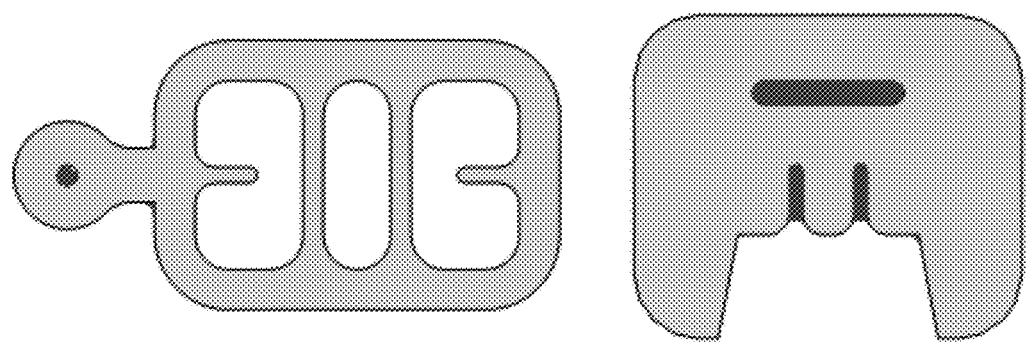
FIG. 7: Small holes, narrow intrusions, and concave corners (shown as dark shading) identified with the help of morphological closing operation.

The finite resolution of the 3D printers also prevent small holes and narrow intrusions from being manufactured without errors. Usually, the shape of such holes and intrusions is distorted in the printed product due to over- or under-deposition of material. Rectification of such features in the design before fabrication is important. Automatic identification of small holes and intrusions can be achieved using morphological operations. We will use the printer resolution ($\tau$) as the limiting size for these features. Regions (R) made up of such features can be extracted using the following expression:

$$R = \Phi(S,\tau) - S = \epsilon_\tau(\delta_\tau(S)) - S \quad (5)$$

where $\Phi(A, b)$ represents the morphological closing operation (dilation followed by erosion) performed on A with a circular structuring element of diameter b. FIG. 7 shows the regions R extracted using the above expression from example slices. Note that in addition to small holes and narrow intrusions, region R also includes concave sharp corners.

Figure 17:
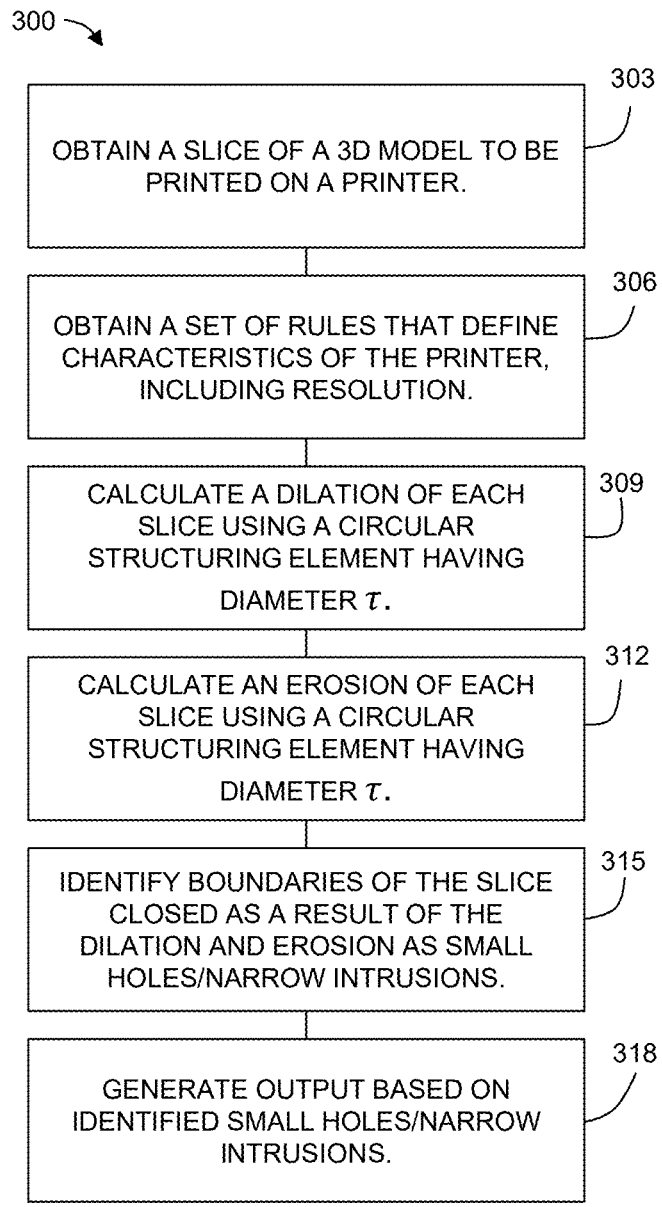
FIG. 17 is a flowchart showing a method according to another embodiment of the present disclosure.

With reference to FIG. 17, in another embodiment of the present disclosure, a method 300 is provided for determining small holes (narrow intrusions) of a 3D model (a slice of a 3D model). The method 300 includes obtaining 303 a slice of a 3D model to be printed on a printer, where the printer has a printer resolution ($\tau$). The obtained slice may be obtained in any manner. For example, the method 300 may include the step of slicing the 3D model, which may be done according to the printer to be used. In another example, the slice is obtained from a separate process. The slice has boundary edges that define the shape of the slice. For example, a slice of a 3D model may have a boundary (or more than one boundary) which is made up of a plurality of boundary edges and vertices, where adjacent boundary edges meet at a vertex (see, for example, FIG. 3A). The method 300 may include obtaining 306 a set of rules that defines one or more characteristics of the printer, including a printer resolution $\tau$.

The method includes calculating 309 a dilation of the slice using a circular structuring element having diameter $\tau$. An erosion of the slice is calculated 312 using a circular structuring element having diameter $\tau$. Boundaries of the slice which are closed by the dilation and erosion are identified 315 as small holes/narrow intrusions. An output is generated 318 showing the identified boundaries of closed features

3.4. Measuring Printability Index of Slices

The printability index is a quantitative measure of printability of a 3D model given a specific printing process and its parameters. A reliable measure of printability can prove to be very useful in many circumstances. For instance, it can be used by designers and engineers to validate the printability of their designs and obtain feedback during the design phase. Manufacturing specialists can use it to evaluate the printability of parts before the actual fabrication. Multiple design solutions can be compared based on their ease of printability. It can also prove to be useful in identifying an optimal build orientation. A cost versus printability study can be performed to identify a suitable printing process for producing parts economically and with high quality. More details about cost versus printability trade-off is presented in Section 5.2.

An estimate of the printability of a 3D model can be made by accumulating printability indices of each of its slices. To quantify the printability of a slice, the expanse of critical error-prone regions in the slice is measured. To this end, the following areas may be computed: $A_{slice}$—the area of the slice, $A_{thin}$—the area of thin regions of the slice (bridges and extrusions), $A_{cnvx}$—the area of convex sharp corners of the slice, and $A_{over}$—the area of small holes, narrow intrusions, and concave corners of the slice.

$A_{slice}$ is easily computed by calculating the area covered by the slice in the 2D plane. The area of thin regions, $A_{thin}$, is computed as a fraction K of $A_{slice}$. The fraction K is approximated to be the ratio of sum of vertex SDF values below printer resolution ($\tau$) to the sum of all vertex SDF values. In embodiments where all edge lengths are approximately equal after resampling, it is fair to assume that each vertex is associated with an area in the slice proportional to its SDF value. Therefore, the fraction K can be used to acceptably approximate the thin regions area $A_{thin}$.

$$K = \frac{\sum_{v:S°(v)\leq \tau} S°(v)}{\sum_v S°(v)} \quad (6)$$

$$A_{thin} = K A_{slice} \quad (7)$$

Figure 8:
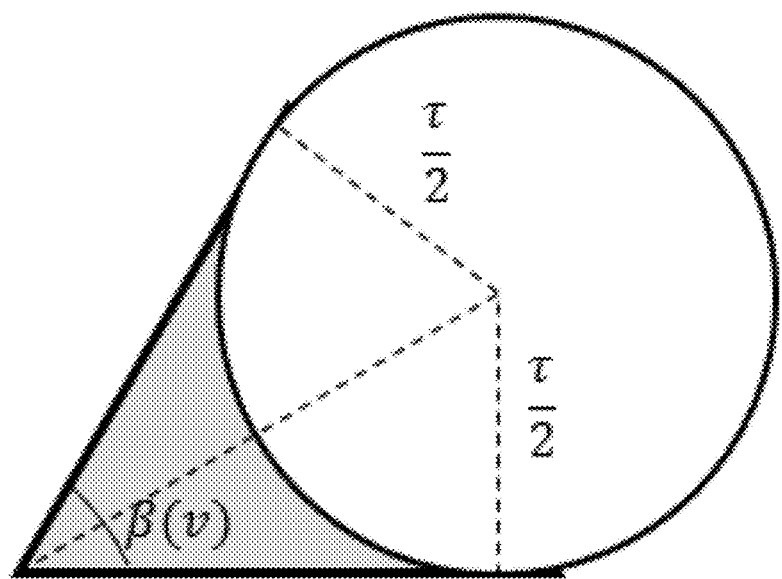
FIG. 8: The gray region depicts the area of the convex corner.

For convex corners, $A_{cnvx}$—is the sum of areas of all convex corners in the slice. The area at a vertex v identified as convex corner with interior angle $\beta(v)$ is the area excluded by a circle of radius $\tau/2$ and tangent to the two edges at the corner (see FIG. 8). It is given as follows:

$$A_{cnvx} = \sum_{v:\beta(v)<\beta_l} \frac{\tau^2}{4}\left(\cot\left(\frac{\beta(v)}{2}\right) + \frac{\beta(v)}{2} - \frac{\pi}{2}\right) \quad (8)$$

The area $A_{over}$ includes the regions where it is expected that the printer will over-deposit material, such as small holes, narrow regions, and concave corners. These regions are not part of the region covered by the slice. Hence, $A_{over}$ and $A_{slice}$ are exclusive of each other. $A_{over}$ can be computed by calculating the area of the region R computed in Eq. 5. The printability index p for the slice is given by:

$$\rho = 1 - \frac{A_{thin} + A_{cnvx} + A_{over}}{A_{slice} + A_{over}} \quad (9)$$

Figure 9:
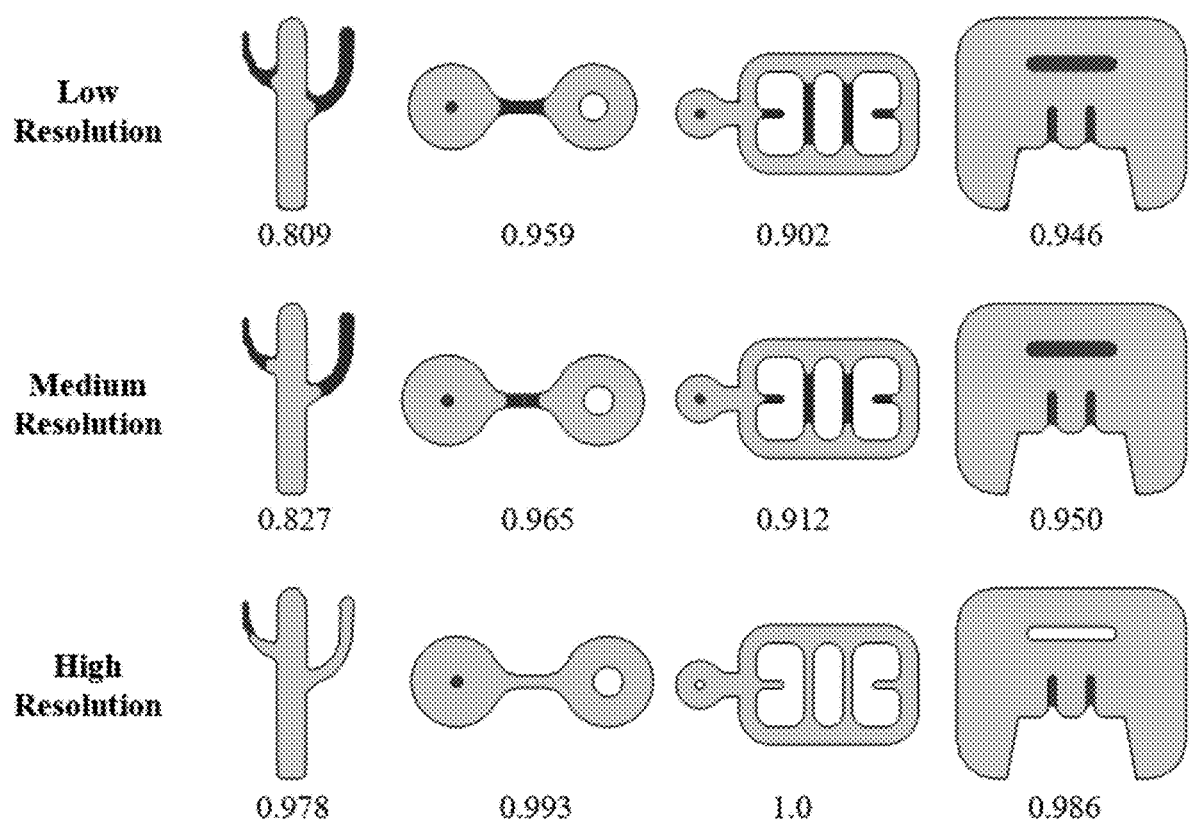
FIG. 9: Printability index of slices at varying printer resolution. As expected, the index increases as the resolution of printer increases signifying better printability.

The value of printability index $\rho$ is in the range [0,1], where a higher value indicates that a slice may be printed with fewer errors than a slice with a lower value. Note that the value of $\rho$ is a function of slice geometry as well as printer resolution $\tau$. FIG. 9 shows the variation in printability index for example slices with changing printer resolution. Accumulating the printability of each slice, such as by averaging, would provide an estimate of the printability of the complete 3D model. The designers and engineers can use the feedback and improve the printability of the designs by locally modifying the error-prone regions. Automatic correction of such features is also possible to some extent. The following section describes techniques developed to correct the identified critical regions in the slices.

4. Local Deformations for Improved Printability

Designers and engineers can investigate the identified error-prone regions and manually make modifications to correct for manufacturing errors. However, in most cases, it is possible to automatically rectify the designs without any manual input. Automatized local deformations of the design, such as thickening of thin regions, rounding of sharp corners, and filling of small holes, is achievable using a few existing computational techniques. A technique called SDFix for making local corrections to enhance the printability of a given design is disclosed.

4.1. Physics-Based Model: SDFix

Figure 10:
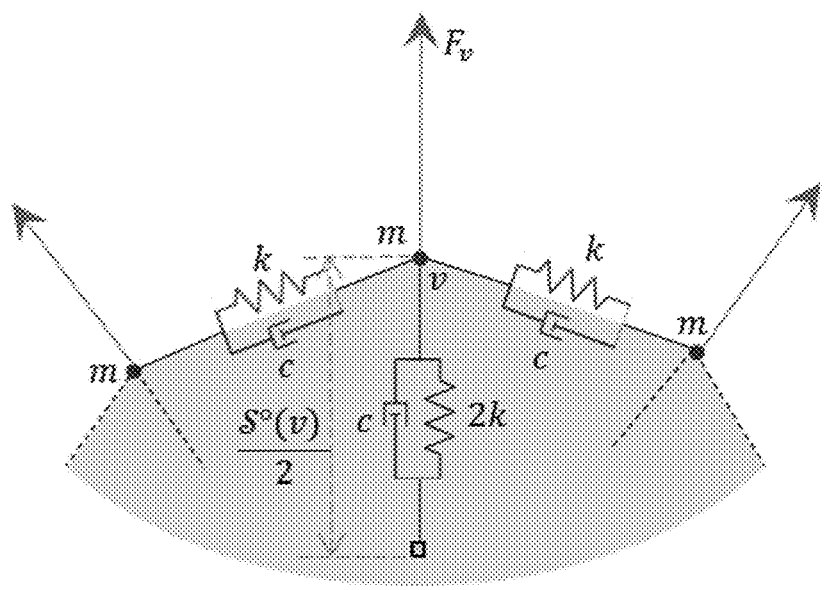
FIG. 10: SDFix mass-spring-damper system on the slice boundary.

SDFix utilizes surface deformation techniques to model 150 slice boundaries as mass-spring-damper systems in 2D. In an SDFix model, a unit point mass m is placed on each vertex of a boundary in a slice. For each vertex, an external force along the outward normal of the vertex is applied 153 to the mass. The magnitude of the force is determined based on the vertex shape diameter $S°$ and the interior angle $\beta$. The force displaces the vertex and hence deforming the boundary to improve its printability. To prevent large deformations, a spring with spring constant $\kappa$ is placed on each edge connecting the masses at its ends. Also, each vertex is connected to the skeleton of the slice at a vertex reference point by a skeleton spring having a skeleton-spring constant. This is done so that the slice maintains its original global structure and shape, even after application of external forces. The vertex reference point for a vertex is immovable and is defined by extending its inward normal to a distance equal to half its shape diameter function. The skeleton-spring constant may be 2 k. When modeling the system, it is practical to model each spring in the system with a damper of damping coefficient c, so that the fluctuations decay over time and the system attains its steady state. FIG. 10 shows a portion of the SDFix mass-spring-damper system.

The forces are applied 153 at the vertices to rectify the thin regions and sharp corners identified in the slice. The forces are directed along the vertex normal (outward vertex normal). For thin regions, the magnitude of force F at a vertex v with shape diameter $S°(v)$ is given as follows:

$$F_v^1 = \begin{cases} u_s k\tau\left(1 - \frac{S°(v)}{\tau}\right), & \text{if } S°(v) \leq \tau \\ 0, & \text{otherwise} \end{cases} \quad (10)$$

where, $u_s$ is a user-defined constant multiplier. The force $F_v^1$ is larger at vertices with small shape diameters. The force helps in thickening the thin regions. To preserve local smoothness, an exponentially decaying force may be applied 156 on the n-neighborhood on either side of each vertex v with $S°(v) \leq \tau$. In a particular example, the exponentially decaying force is applied 156 to the three neighbors on either side of each vertex with an SDF less than or equal to the printer resolution, though other values including more or less neighbors may be used. If vertex $v_n$ is n-neighbor ($n \leq 3$) of vertex v with $S°(v) \leq \tau$, then the force $F_{v_n}^2$ is given by:

$$F_{v_n}^2 = e^{-n} F_v^1. \tag{11}$$

For sharp corners, the slice boundaries may be modeled 221 as above, and forces may be applied 224 to make them more rounded. For example, a vertex with interior angle $\beta(v)$ may have a force applied with a magnitude according to:

$$F_v^3 = \begin{cases} -u_c k \frac{\tau}{2} \left( \sin\left(\frac{\alpha}{2}\right) - 2\tan\left(\frac{\alpha}{2}\right) \sin\left(\frac{\beta(v)}{2}\right) + \cos\left(\frac{\beta(v)}{2}\right) \right), & \text{if } \beta(v) < \beta_l \\ u_c k \frac{\tau}{2} \left( \sin\left(\frac{\alpha}{2}\right) - 2\tan\left(\frac{\alpha}{2}\right) \sin\left(\frac{\beta(v)}{2}\right) - \cos\left(\frac{\beta(v)}{2}\right) \right), & \text{if } \beta(v) > \beta_u \\ 0, & \text{otherwise} \end{cases} \tag{12}$$

where, $u_c$ is a user-defined constant multiplier and $\alpha$ is a constant angle. The above expression is formulated by approximating the printer resolution circle of diameter $\tau$ as a p-sided regular polygon. The angle $\alpha$ is the angle subtended by each side of the polygon at its center, i.e., $\alpha = 2\pi/p$.

Considering the above-referenced forces (e.g., Eq. (10)-(12)), the total force magnitude $F_v$ at a vertex v may be given by:

$$F_v = \max(F_v^1, F_v^2) + F_v^3 \tag{13}$$

The external force $F_v$ is applied along the outward normal on the vertex v. All the vertices v with $F_v = 0$ may be enforced to be fixed (immovable). In addition to $F_v$, each mass experiences internal forces due to the spring and damper connections. At a given time t, the state of the SDFix system is defined by the positions $x_i$ and velocities $\dot{x}_i$ of the masses at vertices $v_i$ (i=1, 2, ..., n). The net force vector $f_i$ on each mass is the result of spring and damper forces from its neighboring connections and the external force $F_{v_i}$. The spring and damper force $f_{ij}$ on a vertex $v_i$ due to its neighbor $v_j$ is given as:

$$f_{ij} = k(\|x_j - x_i\| - l_{ij}) \frac{x_j - x_i}{\|x_j - x_i\|} + c(\dot{x}_j - \dot{x}_i) \tag{14}$$

where $\kappa$ is the spring constant of the spring connecting $v_i$ to $v_j$, c is the damper coefficient of the damper between $v_i$ and $v_j$, and $l_{ij}$ is the rest length of the spring.

The motion of each mass is governed by Newton's second law $f_i = m\ddot{x}_i$, where $\ddot{x}_i$ is the acceleration of mass at vertex $v_i$. The SDFix system for two-dimensional slice can be expressed in matrix form as:

$$M\ddot{x} = f(x, \dot{x}) \tag{15}$$

where M is diagonal mass matrix of dimensions 2n×2n; x, $\dot{x}$, and $\ddot{x}$ are position, velocity, and acceleration vectors of length 2n, respectively; and f is a force vector of length 2n that is a function of positions and velocities.

4.2. Numerical Time Integration

The system of coupled ordinary differential equations (ODEs) formulated in Eq. 15 is solved by a numerical time integration scheme. As initial condition, the state at time t=0 is considered to start from rest with zero kinetic and potential energy, i.e., $\dot{x}=0$ and springs are considered to be at their rest length. Given a state $(x^t, \dot{x}^t)$ at time t, the next state at time $t+\Delta t$ is obtained by using an implicit backward Euler method. In this method, the updates in positions $\Delta x$ and velocities $\Delta \dot{x}$ with time step $\Delta t$ are computed as follows:

$$\begin{bmatrix} \Delta x \\ \Delta \dot{x} \end{bmatrix} = \Delta t \begin{bmatrix} \dot{x}^t + \Delta \dot{x} \\ M^{-1} f(x^t + \Delta x, \dot{x}^t + \Delta \dot{x}) \end{bmatrix} \tag{16}$$

The above equation is non-linear. Hence, to make the computation easier and efficient, we linearize the system by making first order approximation in Taylor series expansion of f.

$$f(x^t + \Delta x, \dot{x}^t + \Delta \dot{x}) = f(x^t, \dot{x}^t) + \frac{\partial f}{\partial x}\bigg|_t \Delta x + \frac{\partial f}{\partial \dot{x}}\bigg|_t \Delta \dot{x} \tag{17}$$

Figure 11:
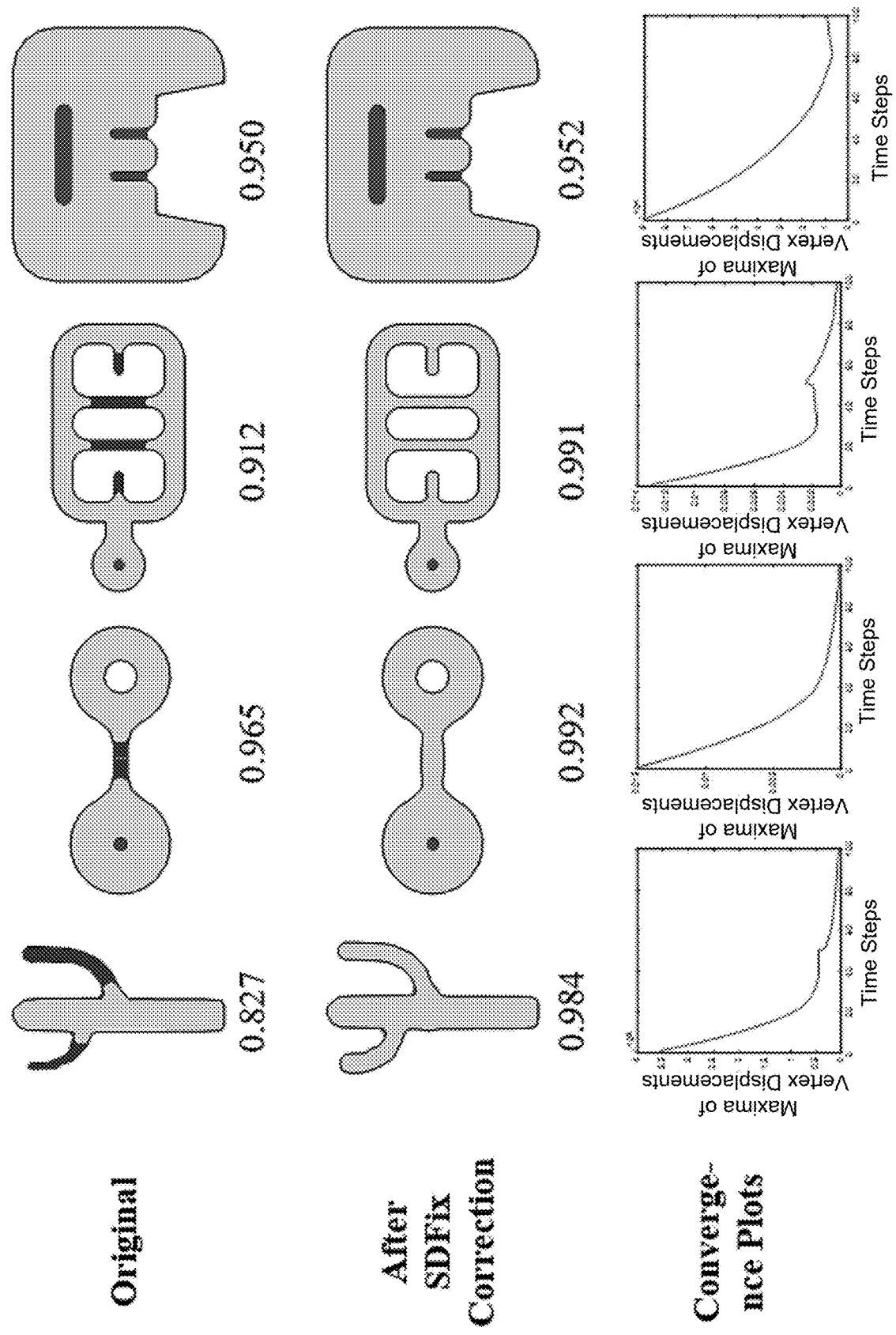
FIG. 11: Four examples of SDFix based local deformations used for correcting thin regions and sharp corners in 2D slices. Note that the printability index is drastically improved after corrections. The convergence plots of numerical time integration are also presented.

The partial derivatives or Jacobian matrices $\partial f/\partial x$ and $\partial f/\partial \dot{x}$ are computed for the state at time t. Substituting the above force approximation in Eq. 16 yields the following:

$$A \Delta \dot{x} = b \tag{18}$$

and $$\Delta x = \Delta t (\dot{x}^t + \Delta \dot{x}) \tag{19}$$

where, $$A = \left( I - \Delta t M^{-1} \frac{\partial f}{\partial \dot{x}}\bigg|_t - \Delta t^2 M^{-1} \frac{\partial f}{\partial x}\bigg|_t \right),$$

$$b = \Delta t M^{-1} \left( f(x^t, \dot{x}^t) + \Delta t \frac{\partial f}{\partial x}\bigg|_t \dot{x}^t \right),$$

and I is the identity matrix. Due to the local connectivity structure in SDFix model, the Jacobian matrices are sparse and hence the matrix A is also sparse. To efficiently solve the sparse SDFix system, LAPACK and SuperLU solver were used with Armadillo library in C++. At each time step, f, $\partial f/\partial x$ and $\partial f/\partial \dot{x}$ are evaluated, then the linear system of equations in Eq. 18 and 19 is formed and solved to obtain $\Delta x$ and $\Delta \dot{x}$, and finally, positions x and velocities $\dot{x}$ are updated. Due to the expensive computational cost of calculating shape diameters $S°$, it is not reevaluated at each time step. The magnitude of external forces $F_v$ is kept constant during time stepping. However, after every certain number of pre-specified steps, the system is reset, the shape diameters are recomputed, spring rest length is reinitialized, the velocities are set to zero, and the time integration process is repeated until convergence or steady state is achieved. Examples of original slices S and the corresponding SDFix-corrected slices S' are shown in FIG. 11 along with their respective printability indices and convergence plots.

4.3. Morphological Operations

Figure 12:
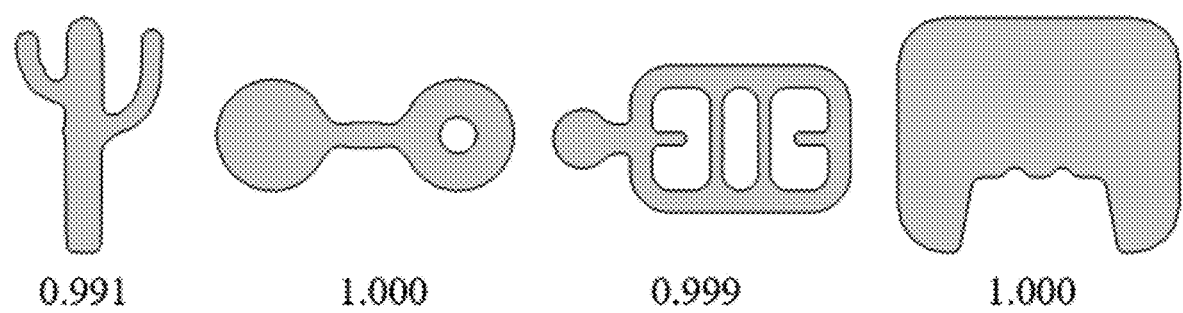
FIG. 12: The final slices and their printability indices after morphological closing operation on SDFix corrected slices shown in FIG. 11.

As disclosed above, thin regions and sharp corners in slices may be corrected using the SDFix deformation technique. However, small holes and narrow intrusions in the slices can cause printing errors too. To overcome these errors, such small holes and narrow intrusions may be eliminated from the slices during printing. Later, the holes and intrusions may be recreated by subtractive manufacturing. Thus, to eliminate these features from the slices, a morphological closing operations may be used. For example, the SDFix corrected slice S', may be dilated and then eroded with a circular structuring element representing a printer resolution circle of diameter τ. Examples of final slices S obtained after closing are shown in FIG. 12.

$$\bar{S}=(S',\tau)=\in_\tau(\delta_\tau(S')) \quad (20)$$

5. Other Applications of SDFix 5.1. Extending SDFix to 3D Model Rectification:

The present SDFix approach for local correction of unprintable regions of slices can be extended to three-dimensional space and applied to 3D models. The 3D application of SDFix can be useful in several scenarios. For example, traditional manufacturing processes, such as casting and milling, demand a threshold on a minimum feature size. Furthermore, for structural performance and stability, designers and engineers often specify a recommended minimum feature size. To adhere to these requirements and specifications, local corrections using physics-based mesh deformation can be applied to 3D designs. With this deformation scheme, critically thin features of 3D models can be locally thickened.

For 3D-SDFix, a fine surface mesh of the 3D design is used. Similar to the 2D version of SDFix, a shape diameter may be computed at each of vertex of the surface mesh. In an exemplary embodiment, face shape diameters ($S^\Delta$) for all faces on the surface mesh were computed using the CGAL library. Using the face shape diameter results, the vertex shape diameter $S^\circ(v)$ at each vertex v was calculated by taking weighted average of shape diameters at the faces incident on v.

$$S^\circ(v) = \frac{\sum_{f \in \mathcal{N}(v)} w_v(f) * S^\Delta(f)}{\sum_{f \in \mathcal{N}(v)} w_v(f)} \quad (21)$$

where, $\mathcal{N}(v)$ is the set of faces incident on vertex v, and $w_v(f)$ is the weight calculated as the projected area of face f on the plane perpendicular to the vertex normal at v.

Figure 13:
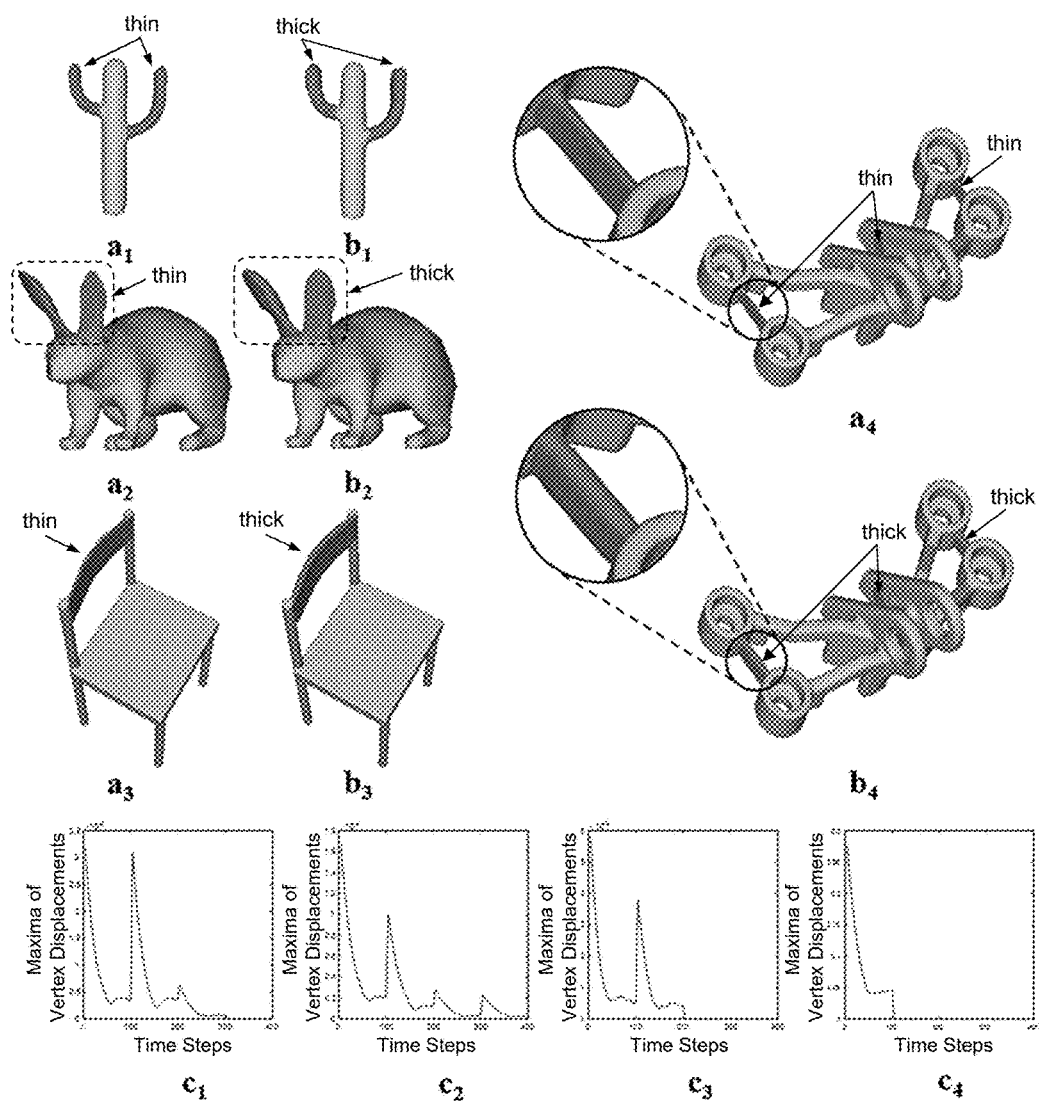
FIG. 13: Four examples (1-4) of 3D-SDFix based local deformations used for thickening of identified thin regions in 3D models. (a) The identified thin regions are labeled. (b) The thickened regions after mesh deformation are labeled. (c) The convergence plot of 3D-SDFix; sharp peaks correspond to resetting of shape diameters and spring and damper system on the mesh.

The specified threshold diameter was used to identify the thin regions, associated with the vertices that have shape diameter value below the threshold diameter. Identification of the thin regions was followed by modeling the surface mesh as a mass-spring-damper system, similar to Section 4.1 but in three-dimensions. External forces $F_v$ were computed in similar fashion for thin regions of 3D models. $F_v$'s were functions of vertex shape diameters and were applied on the unit point masses at vertices along the corresponding vertex normals. The 3D-SDFix structure was then formulated as a system of coupled ODEs and implicit backward Euler method and first order approximations were used to form a linear system of equations as in Eq. 18 and 19. By time stepping and updating positions and velocities until steady state is achieved, the locally thickened and corrected surface mesh was obtained. The identified thin regions, the deformed surface mesh results, and the convergence plots of several 3D examples are shown in FIG. 13.

5.2. Printability Vs. Cost Trade-Off

As discussed earlier, the finite size of the printer resolution limits the quality of 3D features printable. Often the designers and manufacturers are faced with the dilemma of choosing between low and high resolution printers. Although high-resolution printers result in better printability (and better quality of the printed product), they are also usually accompanied with added cost when compared to low-resolution printers. The higher cost is mainly due to two reasons: (1) high-resolution printers are more expensive than their low-resolution counterparts and (2) high-resolution printing usually results in higher fabrication time due to the longer overall tool-path length.

Figure 14:
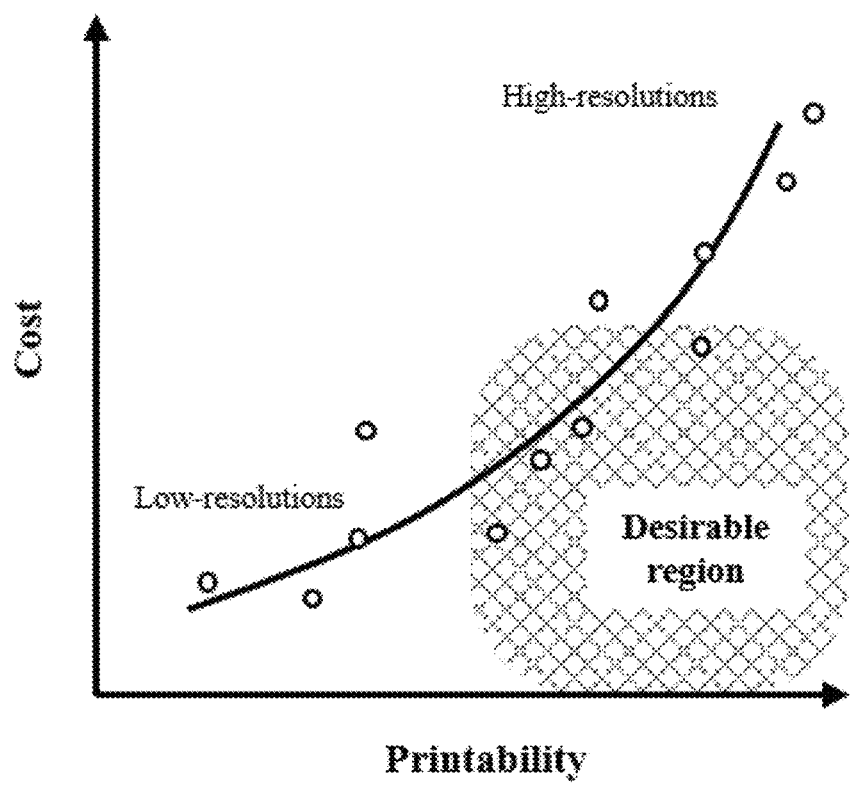
FIG. 14 is a graph showing high-resolution printers produce good quality parts but at a higher price, whereas low-resolution printers are cheaper but parts produced might not be as good.
Figure 15:
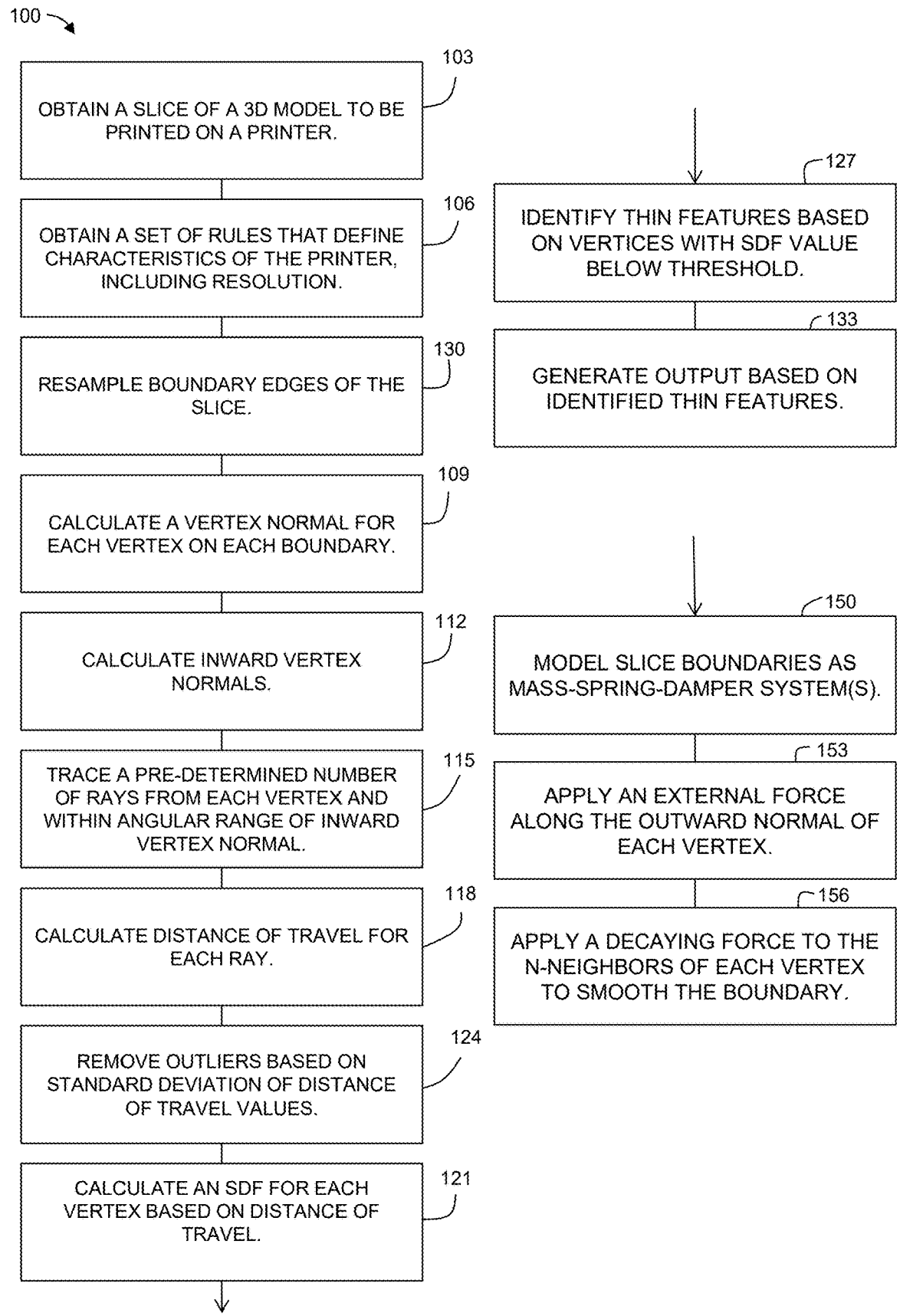
FIG. 15 is a flowchart showing a method according to an embodiment of the present disclosure.

The identified critical error-prone regions can be used to estimate printability index as described in Section 3.4. The printability index provides a measure of expected quality of printed part at a particular printer resolution. For different resolutions, printability index can be computed. Similarly, cost of printing can also be estimated based on the printer resolution and other process parameters. The trade-off between cost of printing and print quality can be assessed by engineers and manufacturers using these estimates at multiple printer resolution. An example graph showing the variation of printability and cost with the printer resolutions is shown in FIG. 14. The printer with the right resolution that satisfies the needs and specifications can be chosen and used for fabricating the part.

6. Conclusion

Shape diameter-based approaches to identifying and correcting 2D slices and 3D models for improved manufacturability are provided. Using the present approach, critical error-prone regions in 2D slices can be identified, including thin extrusions and bridges, sharp corners, small holes, and narrow intrusions. The areas of these regions were computed and used to quantify the printability of the slices. As expected, the results show that printability increases with increasing resolution of the printers. The boundaries of 3D model slices were modeled as mass-spring-damper systems for performing local deformations to correct error-prone regions. External forces, that were a function of shape diameters and interior angles, were introduced on the modeled systems for this purpose. The system was mathematically represented as a system of coupled ordinary differential equations. It was then linearized and solved iteratively with time-stepping. Morphological operations were used as post-processing on the resulting slice to correct for small holes and narrow intrusions. The results demonstrate that the present technique was able to boost the printability of the slices.

In addition to correcting the 2D slices for printability, the present approach can also be extended to three dimensions. Thin features of 3D models can be thickened using the extended 3D-SDFix method. This allows for improving the manufacturability of 3D model as well enhancing the structural performance and stability in some cases. Furthermore, the printability of a 3D model can be quantified in any build orientation by accumulating the printability index of its slices. The printability index can be used for variety of purposes, such as comparing multiple design solutions, finding optimal build orientations, and deciding an economical and effective printing process for fabricating the model.

An interface may be used for user visualization and inputs. In an exemplary interface, a user can analyze a 3D model or 2D slice for different printing processes and parameters. The identified critical regions can be presented to a user. The printability index can also be shown. Corrections can be computed and proposed as suggestions. Users will have the ability to accept or reject the corrections individually or as a whole. They can also choose to modify the design manually to fix the identified regions. The printability feedback that includes the error-prone regions and printability index can be updated in real-time.

The present approach can also be easily integrated with web-based 3D printing services for small- to large-scale businesses. Customers are able to obtain a real-time feedback about the printability of their designs. The feedback can be used to evaluate multiple design solutions. An estimate of the quality of models after fabrication can be presented for all the available printing processes and equipment. In addition, cost estimates can also be presented as price quotations. Customers can decide to employ any of the available equipment for fabrication based of the price quotes and expected quality of parts. At the businesses end, such a system can be used to identify proper build orientations of the designs. Additionally, they can provide constructive feedback to customers about design changes that could improve the printability of their designs.

Further embodiments of the systems and methods of the present disclosure are described below:

Example 1. A method for automatically determining thin features of a slice of a 3D model, comprising:
  obtaining a slice of a 3D model to be printed on a printer having a printer resolution ($\tau$), wherein the slice has at least one boundary defined by boundary edges and vertices v;
  calculating a vertex normal for each vertex on the at least one boundary;
  calculating an inward vertex normal for each vertex by negating each vertex normal;
  tracing a pre-determined number of rays from each vertex, each of the rays of each vertex extending in a direction within a pre-determined angular range and which direction is different than the other rays of such vertex;
  calculating a distance of travel for each ray before a first intersection with the at least one boundary of the slice; and
  calculating an shape diameter function (SDF) $S°(v)$ for each vertex as the average of distances of travel for the rays of such vertex.

Example 2. The method of Example 1, wherein the pre-determined angular range is from −15° to 15°, inclusive.

Example 3. The method of any one of Examples 1-2, further comprising generating an output showing each vertex having an SDF below a pre-determined first threshold as a thin feature.

Example 4. The method of Example 3, wherein the generated output is a visualization of the slice wherein each thin feature is depicted differently than the remainder of the slice.

Example 5. The method of Example 3, wherein the generated output is a visualization of the 3D model wherein each thin feature is depicted differently than the remainder of the 3D model.

Example 6. The method of any one of Examples 1-3, wherein for each vertex, ray distances of travel greater than one standard deviation are not used to calculate the average of ray distances of travel for such vertex.

Example 7. The method of any one of Examples 1-3, further comprising resampling the boundary edges of the slice, such that each boundary edge has an edge-length less than or equal to a threshold edge-length (g).

Example 8. The method of Example 7, wherein g=$\tau$/4.

Example 9. The method of one of the preceding Examples, further comprising automatically rectifying thin features of the 3D model.

Example 10. The method of Example 9, wherein automatically rectifying thin features comprises:
  modeling each boundary as a mass-spring-damper system, wherein each vertex is modeled as a mass having mass m, each mass is attached to adjacent masses along the boundary by an edge spring having an edge-spring constant, and each mass is connected to a corresponding vertex reference point by a skeleton spring having a skeleton-spring constant;
  applying a force $F_v^1$ to each mass of the model along the vertex normal;
  determining a new position of each vertex as the position of the corresponding mass after applying the force.

Example 11. The method of Example 10, wherein the edge-spring constant is k, the skeleton-spring constant is 2 k, and a magnitude of the force $F_v^1$ applied to each mass is determined as:

$$F_v^1 = \begin{cases} u_s k\tau\left(1 - \frac{S°(v)}{\tau}\right), & \text{if } S°(v) \le \tau \\ 0, & \text{otherwise} \end{cases}$$

where $u_s$ is a predetermined multiplier.

Example 12. The method of Example 11, wherein automatically rectifying thin features further comprises applying a exponentially decaying force $F_v^2$ on the n-neighbors of each vertex with an SDF less than or equal to the printer resolution ($\tau$), where n is a predetermined value and the force $F_v^2$ is determined as:

$$F_{v_n}^2 = e^{-n} F_v^1.$$

Example 13. The method of any one of Examples 10-12, wherein each edge spring and skeleton spring includes a corresponding damper, each damper having a dampening coefficient.

Example 14. A system for operation of a 3D printer, comprising at least one processor configured to:
  perform the method of any one of Examples 1-13; and
  control a 3D printer to print the slice.

Example 15. A method of determining sharp corners of a 3D model, comprising:
  obtaining a slice of the 3D model to be printed on a printer having a printer resolution ($\tau$), wherein the slice has at least one boundary defined by boundary edges and vertices v;
  calculating an interior angle $\beta(v)$ formed at each vertex by adjacent vertices;
  determining the vertices having interior angles less than a pre-determined lower threshold $\beta_l$ as a convex sharp corner;
  determine each vertex having an interior angle greater than a predetermined upper threshold $\beta_u$ as a concave sharp corner; and
  generating an output showing the convex sharp corners and the concave sharp corners.

Example 16. The method of Example 15, further comprising automatically rectifying sharp corners of the 3D model.

Example 17. The method of Example 16, wherein automatically rectifying sharp corners comprises:
  modeling each boundary as a mass-spring-damper system, wherein each vertex is modeled as a mass having mass m, each mass is attached to adjacent masses along the boundary by an edge spring having an edge-spring constant, and each mass is connected to a corresponding vertex reference point by a skeleton spring having a skeleton-spring constant;

applying a force $F_v^3$ to each mass of the model along the vertex normal;

determining a new position of each vertex as the position of the corresponding mass after applying the force.

Example 18. The method of Example 17, wherein the edge-spring constant is k, the skeleton-spring constant is 2 k, and a magnitude of the force $F_v^3$ applied to each mass is determined as:

$$F_v^3 = \begin{cases} -u_c k \frac{\tau}{2}\left(\sin\left(\frac{\alpha}{2}\right) - 2\tan\left(\frac{\alpha}{2}\right)\sin\left(\frac{\beta(v)}{2}\right) + \cos\left(\frac{\beta(v)}{2}\right)\right), & \text{if } \beta(v) < \beta_l \\ u_c k \frac{\tau}{2}\left(\sin\left(\frac{\alpha}{2}\right) - 2\tan\left(\frac{\alpha}{2}\right)\sin\left(\frac{\beta(v)}{2}\right) - \cos\left(\frac{\beta(v)}{2}\right)\right), & \text{if } \beta(v) > \beta_u \\ 0, & \text{otherwise} \end{cases}$$

where $u_c$ is a predetermined multiplier.

Example 19. The method of any one of Examples 17-18, wherein each edge spring and skeleton spring includes a damper having a dampening coefficient.

Example 20. A system for operation of a 3D printer, comprising at least one processor configured to:

perform the method of any one of Examples 15-18; and control a 3D printer to print the slice.

Example 21. A method of determining small holes of a 3D model, comprising:

obtaining a slice of the 3D model to be printed on a printer having a printer resolution ($\tau$);

calculating a dilation of each slice using a circular structuring element having diameter $\tau$;

calculating an erosion of each slice using a circular structuring element having diameter $\tau$;

identifying any boundaries of each sliced closed as a result of the dilation and erosion as small holes and/or narrow intrusions; and generating an output showing the identified boundaries of closed features.

Example 22. A system for operation of a 3D printer, comprising at least one processor configured to:

perform the method of Example 21; and control a 3D printer to print the slice.

Example 23. A method of determining a printability of a 3D model comprising a plurality of slices, the method comprising:

calculating an area of each slice ($A_{slice}$);

calculating an area of thin regions of each slice ($A_{thin}$);

calculating an area of convex sharp corners of each slice ($A_{cnvx}$);

calculating an area of small holes, narrow intrusions, and concave corners of each slice ($A_{over}$); and determining a printability index $\rho$ as:

$$\rho = 1 - \frac{A_{thin} + A_{cnvx} + A_{over}}{A_{slice} + A_{over}}.$$

Example 24. The method of Example 23, wherein $A_{thin}$ is $\kappa A_{slice}$, where:

$$\kappa = \frac{\sum_{v: S^\circ(v) \leq \tau} S^\circ(v)}{\sum_v S^\circ(v)}.$$

Example 25. The method of any one of Examples 23-24, wherein:

$$A_{cnvx} = \sum_{v: \beta(v) < \beta_l} \frac{\tau^2}{4}\left(\cot\left(\frac{\beta(v)}{2}\right) + \frac{\beta(v)}{2} - \frac{\pi}{2}\right).$$

Example 26. The method of any one of Examples 23-25, wherein $A_{over}$ is the area of the region R, where:

$R = \Phi(S, \tau) - S = \epsilon_\tau(\delta_\tau(S)) - S$.

Example 27. A system for operation of a 3D printer, comprising at least one processor configured to:

perform the method of any one of Examples 23-26; and control a 3D printer to print the 3D model.

Example 28. A method for automatically determining thin features of a 3D model, comprising:

obtaining a 3D model to be printed on a printer having a printer resolution ($\tau$), wherein the 3D model has at least one surface mesh defined by boundary edges and vertices v;

calculating a vertex normal for each vertex on the at least one surface mesh;

calculating an inward vertex normal for each vertex by negating each vertex normal;

tracing a pre-determined number of faces from each vertex, each of the faces of each vertex extending in a direction within a pre-determined angular range and which direction is different than the other faces of such vertex;

calculating a face diameter for each face before a first intersection with the at least one surface mesh of the 3D model; and calculating a shape diameter function (SDF) $S^\circ(v)$ for each vertex as the average of face diameters for the faces of such vertex.

In another aspect, the present disclosure may be embodied as a system for operating a 3D printer. The system includes at least one processor. The at least one processor is configured to perform any of the methods described in an embodiment and/or example herein. The processor is further configured to control a 3D printer to print the slice. In another aspect, the present disclosure may be embodied as a non-transitory computer-readable medium, having computer instructions thereon for causing a processor to perform any of the methods described in an embodiment and/or example herein.

Although the present disclosure has been described with respect to one or more particular embodiments, it will be understood that other embodiments of the present disclosure may be made without departing from the spirit and scope of the present disclosure.

What is claimed is:

1. A method of determining a printability of a 3D model comprising a plurality of slices, the method comprising:

receiving a 3D model input comprising a plurality of slices for a 3D printing process;

calculating an area of each slice ($A_{slice}$);

calculating an area of thin regions of each slice ($A_{thin}$);

calculating an area of convex sharp corners of each slice ($A_{cnvx}$);

calculating an area of small holes, narrow intrusions, and concave corners of each slice ($A_{over}$); and determining a printability index p as:

$$\rho = 1 - \frac{A_{thin} + A_{cnvx} + A_{over}}{A_{slice} + A_{over}}$$

based on the printability index, automatically modifying one or more of the plurality of slices by deforming boundaries of one or more thin regions, convex sharp corners, small holes, narrow intrusions, or concave corners to correct error-prone regions and improve the printability index; and outputting the modified 3D model to a 3D printer for printing.

2. The method of claim 1, wherein $A_{thin}$ is $\kappa A_{slice}$, where:

$$\kappa = \frac{\sum_{v:S°(v) \leq \tau} S°(v)}{\sum_v S°(v)}$$

where $\kappa$ is a thin fraction of $A_{slice}$, $T$ is a printer resolution, $v$ is a vertex of a slice, and $\delta°(v)$ is a shape diameter of vertex $v$.

3. The method of claim 1, wherein:

$$A_{cnvx} = \sum_{v:\beta(v) < \beta_l} \frac{\tau^2}{4}\left(\cot\left(\frac{\beta(v)}{2}\right) + \frac{\beta(v)}{2} - \frac{\pi}{2}\right)$$

where $\tau$ is a printer resolution, $v$ is a vertex of a slice, and $\beta(v)$ is an interior angle if vertex $v$.

4. The method of claim 1, wherein $A_{over}$ is the area of the region R, where:

$$R = \Phi(S,\tau) - S = \epsilon_\tau(\delta_\tau(S)) - S$$

where S is a slice and $\tau$ is a printer resolution.

5. A system for operation of a 3D printer, comprising at least one processor configured to:
perform the method of claim 1; and
control a 3D printer to print the 3D model.

* * * * *